(12) United States Patent
Commis (10) Patent No.: US 11,845,539 B2
(45) Date of Patent: Dec. 19, 2023

(54) STALL TRIGGER SYSTEM (71) Applicant: AIRBUS OPERATIONS LIMITED, Bristol (GB)

(72) Inventor: Ben Commis, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 104 days.

(21) Appl. No.: 17/508,495

(22) Filed: Oct. 22, 2021

(65) Prior Publication Data
US 2022/0194563 A1    Jun. 23, 2022

(30) Foreign Application Priority Data

Dec. 18, 2020   (GB) ..................................... 2020108

(51) Int. Cl.
*B64C 21/08* (2023.01)
*B64C 23/06* (2006.01)

(52) U.S. Cl.
CPC ............ *B64C 21/08* (2013.01); *B64C 23/069* (2017.05)

(58) Field of Classification Search
CPC ....... B64C 21/08; B64C 23/069; B64C 13/16; B64C 23/076; B64C 23/065
USPC ................ 244/204.1, 199.3, 199.4
See application file for complete search history.

(56) References Cited

U.S. PATENT DOCUMENTS

| | | | |
|---|---|---|---|
| 5,209,438 A | 5/1993 | Wygnanski | |
| 6,837,465 B2 * | 1/2005 | Lisy | ........................ B64C 23/06 244/204.1 |
| 7,988,101 B2 * | 8/2011 | Osborne | ................ B64C 23/005 244/75.1 |
| 8,240,616 B2 * | 8/2012 | Miller | ...................... B64C 21/04 244/130 |
| 8,657,238 B2 * | 2/2014 | Fox | .......................... B64C 23/06 244/214 |
| 9,162,754 B2 * | 10/2015 | Boespflug | ............... B64C 21/08 |
| 2004/0129838 A1 | 7/2004 | Lisy et al. | |
| 2007/0114327 A1 | 5/2007 | Dees et al. | |
| 2014/0291453 A1 | 10/2014 | Sankrithi et al. | |

(Continued)

FOREIGN PATENT DOCUMENTS

| | | |
|---|---|---|
| EP | 1 995 171 | 11/2008 |
| EP | 2 441 669 | 4/2012 |

(Continued)

OTHER PUBLICATIONS

Extended European Search Report for Application No. EP 21203546.3, seven pages, dated Mar. 25, 2022.

(Continued)

*Primary Examiner* — Richard Green
*Assistant Examiner* — Nevena Aleksic
(74) *Attorney, Agent, or Firm* — Nixon & Vanderhye P.C.

(57) ABSTRACT

A stall trigger system is disclosed having an aircraft wing tip or aircraft wing tip device, a plurality of sets of stall triggers distributed along a span of the aircraft wing tip or aircraft wing tip device. Each set of stall triggers comprises one or more stall triggers which can be activated to trigger local separation of air flow over the aircraft wing tip or aircraft wing tip device, and each set of stall triggers has a different activation threshold. A control system configured to monitor a parameter, and activate each set of stall triggers in response to the parameter reaching its respective activation threshold.

20 Claims, 10 Drawing Sheets

(56) References Cited

U.S. PATENT DOCUMENTS

2014/0306067 A1 10/2014 Guida
2020/0369380 A1* 11/2020 Langenbacher ...... F15D 1/0075

FOREIGN PATENT DOCUMENTS

| EP | 2 881 323 | 6/2015 |
| EP | 3 284 667 | 2/2018 |
| FR | 3 029 890 | 6/2016 |
| JP | H0-5016892 | 1/1993 |
| WO | 99/054199 | 10/1999 |
| WO | 03/000547 | 1/2003 |

OTHER PUBLICATIONS

Combined Search and Examination Report for GB2020108.3, dated May 21, 2021, 6 pages.

* cited by examiner

STALL TRIGGER SYSTEM

CROSS RELATED APPLICATION

This application claims priority to United Kingdom Patent Application GB 2020108.3, filed Dec. 18, 2020, the entire contents of which is hereby incorporated by reference.

FIELD OF THE INVENTION

The present invention relates to a stall trigger system for an aircraft wing tip or aircraft wing tip device, and a method of activating such a stall trigger system.

BACKGROUND OF THE INVENTION

WO 03/000547 A1 discloses a trip device which is arranged in one or more leading edge sections and can be deployed from within a winglet envelope so as to project above the upper surface of the winglet. The trip device comprises an elongate plate or series of plates which may or may not be continuous along the winglet span which is moveable in a suitable guide arrangement in a leading edge section. On lifting the plate, the flow over the upper surface of the winglet separates downstream of the plate thereby reducing lift on the winglet.

SUMMARY OF THE INVENTION

A first aspect of the invention provides a stall trigger system comprising: an aircraft wing tip or aircraft wing tip device; a plurality of sets of stall triggers distributed along a span of the aircraft wing tip or aircraft wing tip device, wherein each set of stall triggers comprises one or more stall triggers which can be activated to trigger local separation of air flow over the aircraft wing tip or aircraft wing tip device, and each set of stall triggers has a different activation threshold; and a control system configured to monitor a parameter, and activate each set of stall triggers in response to the parameter reaching its respective activation threshold.

A further aspect of the invention provides an aircraft comprising the stall trigger system of the first aspect.

A further aspect of the invention provides an aircraft wing comprising the stall trigger system of the first aspect.

Optionally the aircraft wing comprises a main wing structure, wherein the stall trigger system comprises an aircraft wing tip device attached to a tip of the main wing structure, and the stall triggers are distributed along a span of the aircraft wing tip device.

Optionally the plurality of sets of stall triggers have a spanwise position of 70% span or higher; 80% span or higher; or 85% span or higher.

A further aspect of the invention provides a method of activating a stall trigger system, the stall trigger system comprising a plurality of sets of stall triggers distributed along a span of an aircraft wing tip or aircraft wing tip device, wherein each set of stall triggers comprises one or more stall triggers, and each set of stall triggers has a different activation threshold, the method comprising: monitoring a parameter, and activating each set of stall triggers in response to the parameter reaching its respective activation threshold, thereby triggering local separation of air flow over the aircraft wing tip or aircraft wing tip device.

A further aspect of the invention provides a method of activating a stall trigger system, the stall trigger system comprising a plurality stall triggers distributed along a span of an aircraft wing tip or aircraft wing tip device, the method comprising activating the stall triggers in an activation sequence, thereby triggering local separation of air flow over the aircraft wing tip or aircraft wing tip device in a corresponding sequence of areas of the aircraft wing tip or aircraft wing tip device.

The parameter may be indicative of an angle of incidence or a pressure.

Some or all of the stall triggers may have a chordwise position which is less than 5% of a local chord length of the aircraft wing tip or aircraft wing tip device.

Each stall trigger may be configured such that, on activation, it changes shape or moves so that it protrudes from an aerodynamic surface of the aircraft wing tip or aircraft wing tip device, thereby triggering the local separation of air flow over the aircraft wing tip or aircraft wing tip device.

Each stall trigger may be configured such that, on activation, it changes shape or moves so that it protrudes from the aerodynamic surface of the aircraft wing tip or aircraft wing tip device by less than 2% of a local chord length of the aircraft wing tip or aircraft wing tip device, and preferably by less than 1%.

The stall trigger system may comprise three or more sets of stall triggers.

The stall trigger system may comprise at least ten stall triggers, and preferably at least twenty.

Each set of stall triggers may comprise two or more stall triggers.

The aircraft wing tip or aircraft wing tip device may comprise a leading edge and a trailing edge.

At least part of the leading edge may be substantially straight.

The stall triggers may be distributed along the span of the aircraft wing tip or aircraft wing tip device in a line with an average sweep angle which is less than 50 degrees, and preferably less than 40 degrees.

The aircraft wing tip or aircraft wing tip device may be a winglet.

The aircraft wing tip or aircraft wing tip device may be a tip of an aircraft wing; or it may be a wing tip device, such as a winglet, attached to a tip of a main wing structure.

The sets of stall triggers may be activated in an activation sequence, thereby triggering local separation of air flow over the aircraft wing tip or aircraft wing tip device in a corresponding sequence of areas of the aircraft wing tip or aircraft wing tip device.

The activation sequence may be a cumulative activation sequence.

The cumulative activation sequence may cause an area of separated flow to lengthen in a progressively inboard direction.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
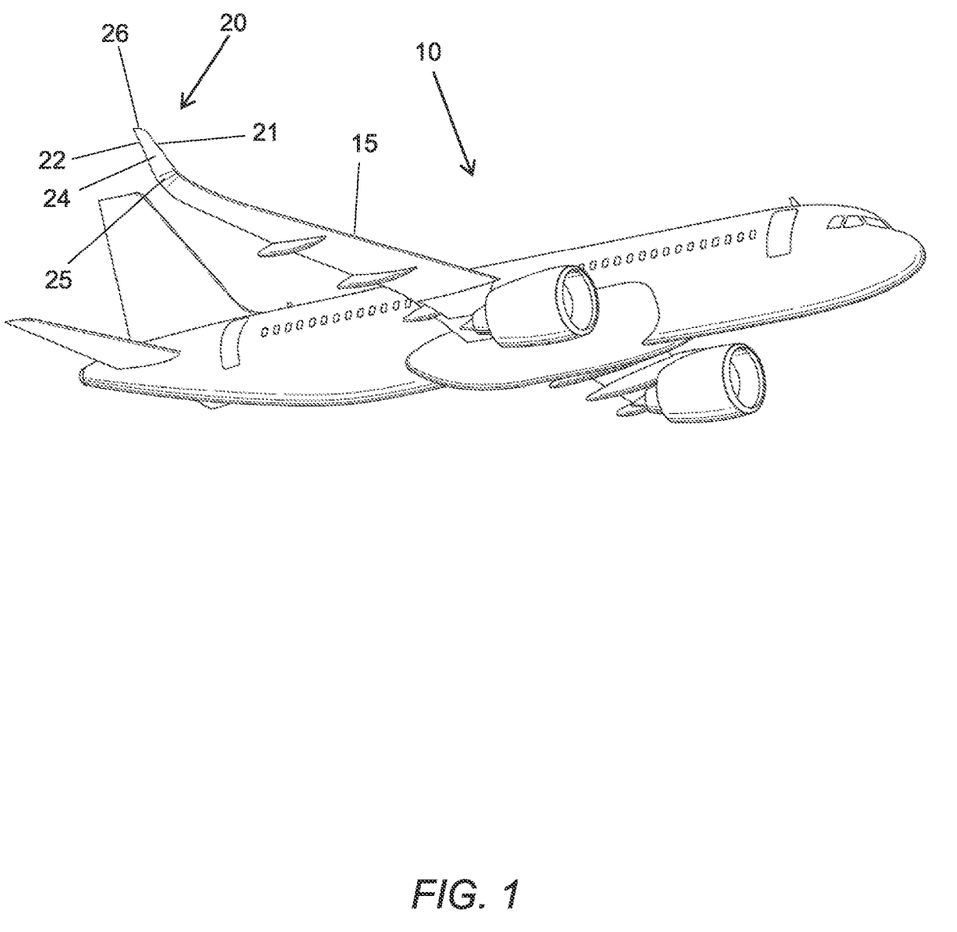
FIG. 1 shows an aircraft.
Figure 2:
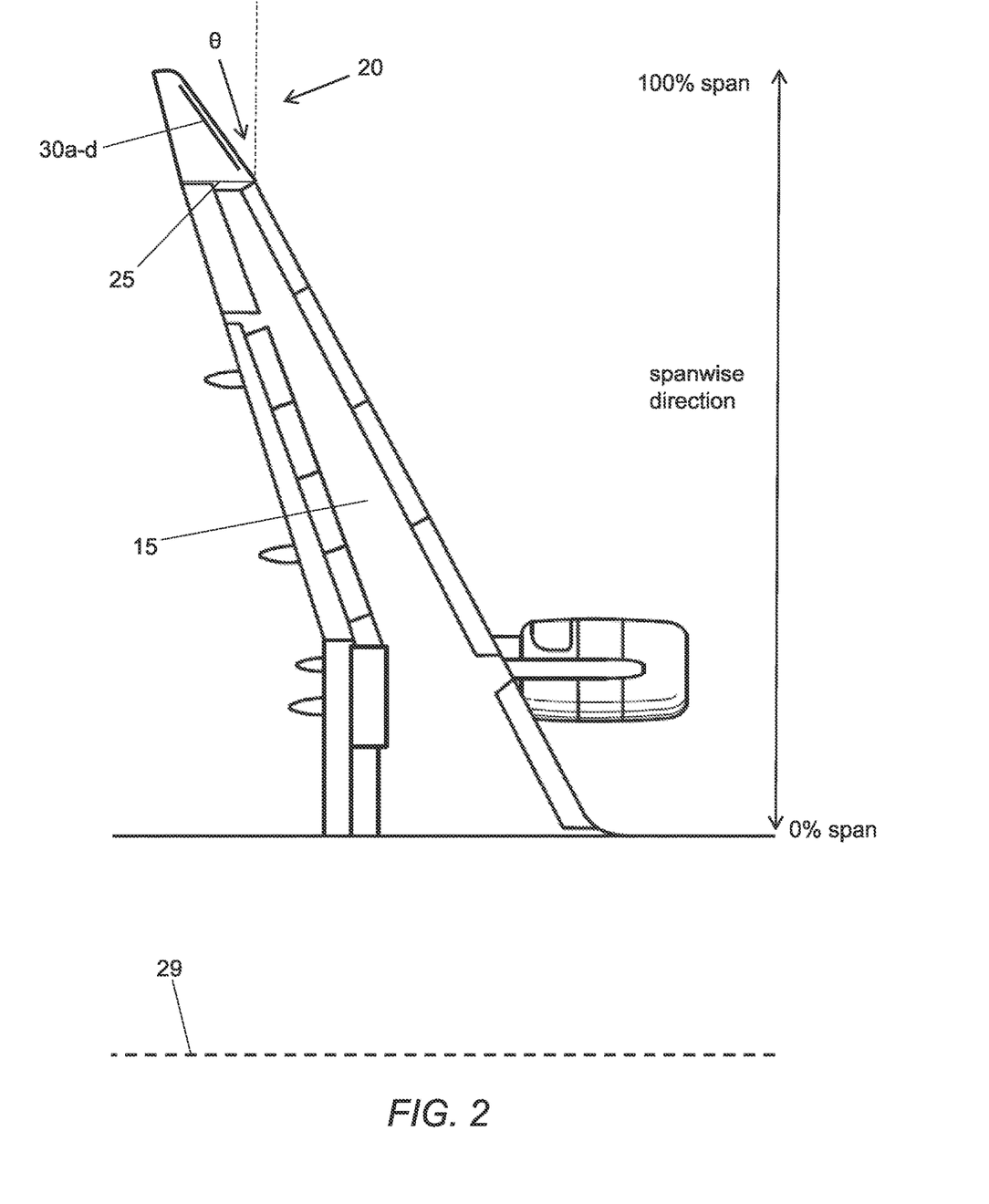
FIG. 2 is a plan view of a wing of the aircraft.
Figure 3:
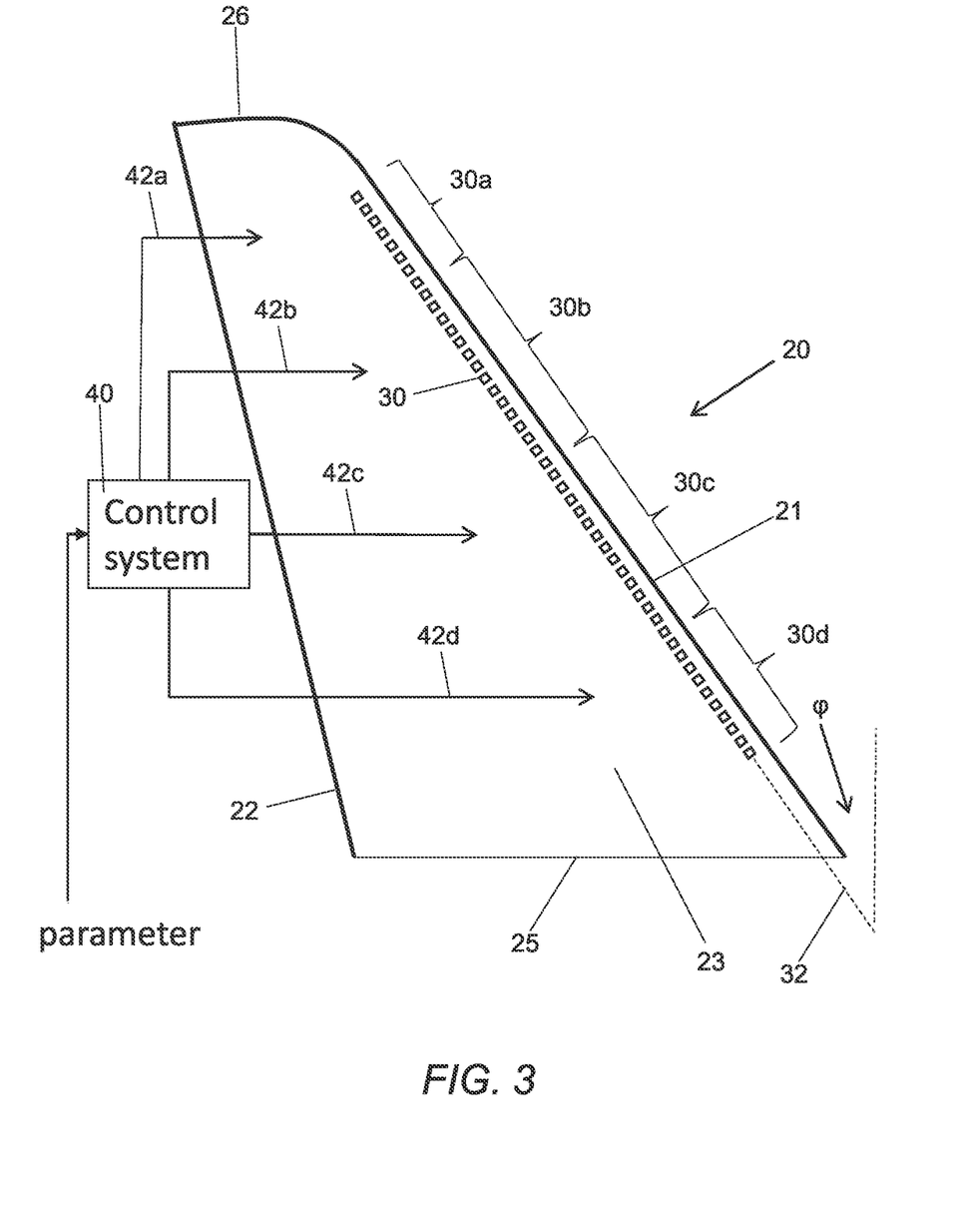
FIG. 3 is a plan view showing a winglet stall trigger system according to an embodiment of the present invention.

FIG. 1 shows an aircraft 10 with a winglet stall trigger system. The aircraft comprises a fuselage and a pair of wings. Each wing comprises a main wing structure 15, and a winglet 20 attached to a tip of the main wing structure 15. The winglet is upwardly directed—in other words it is angled upwardly relative to a plane of the main wing structure 15. The port and starboard winglets are mirror images of each other—only the starboard winglet 20 being visible in FIG. 1. FIGS. 2 and 3 show the winglet 20 in plan.

The winglet 20 has an aerofoil profile with a leading edge 21, a trailing edge 22, an upper aerodynamic surface 23 and a lower aerodynamic surface 24. The leading edge 21 is substantially straight, with a relatively low angle of sweep θ (typically θ is less than 40 degrees) which is indicated in FIG. 2.

The winglet 20 extends from a winglet root 25, where it is attached to a tip of the main wing structure 15, to a winglet tip 26.

The aircraft comprises a stall trigger system shown in FIG. 3, comprising a plurality of sets 30a-d of stall triggers distributed along a span of the winglet 20, and a control system 40. Each set 30a-d of stall triggers comprises a plurality of stall triggers which can be activated to trigger local separation of air flow over the winglet 20.

The span of the aircraft is defined as the distance from the tip of one wing (i.e. the winglet tip 26) to the tip of the other wing. A line from the tip of one wing to the tip of the other wing extends in a spanwise direction indicated in FIG. 2, which is perpendicular to the centreline 29 of the aircraft 10.

The root of the wing is at 0% span and the tip of the wing (i.e. the winglet tip 26) is at 100% span, the % span indicating a spanwise position in the spanwise direction. In this example the winglet root 25 is at about 85% span, so the plurality of sets 30a-d of stall triggers have a spanwise position of 85% span or higher. In other words, they are located in the outermost 15% of the span of the wing.

The stall triggers are all identical, and an exemplary one is given reference number 30, however it will be appreciated that in alternative examples each stall trigger or set of stall triggers may be sized differently, for example in accordance with the span position of each stall trigger 30. Each stall trigger 30 is configured such that, on activation, it changes shape or moves so that it protrudes from the upper aerodynamic surface 23 of the winglet, thereby triggering local separation 31 of air flow over the winglet as shown in FIG. 6, which show the stall trigger 30 in its activated state.

Figure 6:
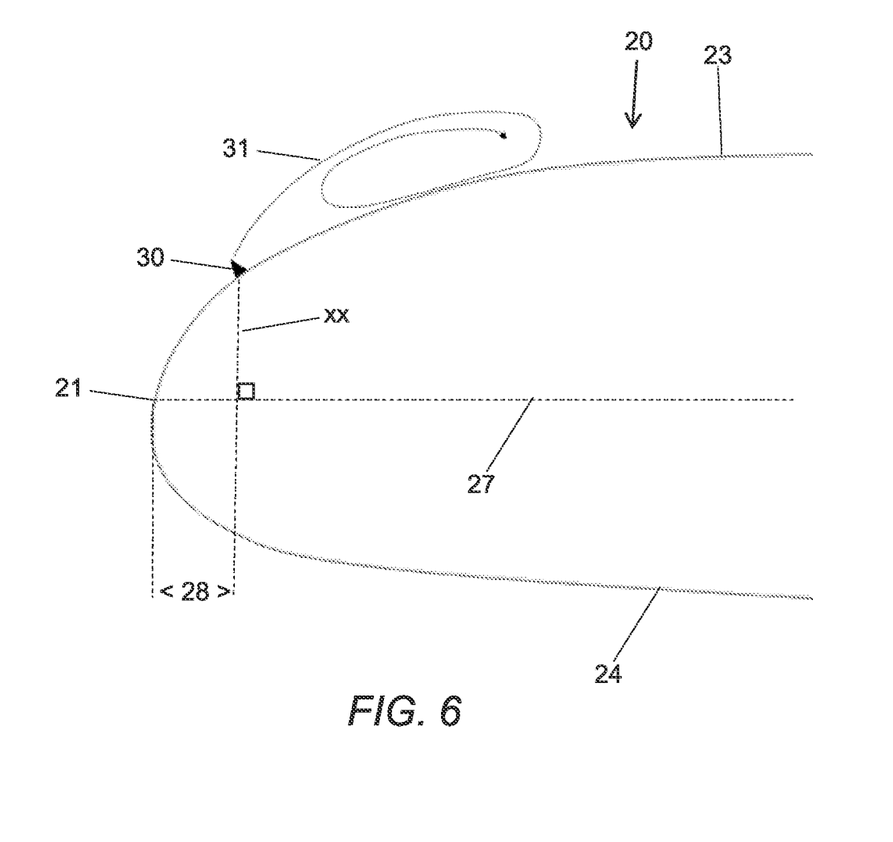
FIG. 6 is a cross-sectional view showing flow separation caused by an activated stall trigger.

As shown in FIG. 6, the winglet has a chord line 27 from the leading edge 21 to the trailing edge 22. The stall triggers 30 are positioned relatively close to the leading edge 21. For example the stall triggers may have a chordwise position 28 which is less than 5% chord (i.e. less than 5% of a local chord length at the spanwise position of the stall trigger).

Each stall trigger 30 is configured such that, on activation, it protrudes from the aerodynamic surface 23 of the winglet by less than 2% of the local chord length, and preferably by less than 1%.

As shown in FIG. 3, the stall triggers are distributed in a substantially straight line 32, parallel with the leading edge 21. Thus, like the leading edge 21, the line 32 has a relatively low average angle of sweep φ (typically φ is less than 40 degrees).

In this example, the majority of the leading edge 21 is substantially straight, and the stall triggers are distributed in a substantially straight line 32. However this is non-limiting, and in other examples the leading edge 21 (and/or the line along which the stall triggers are distributed) may be continuously curved.

Figure 4A:
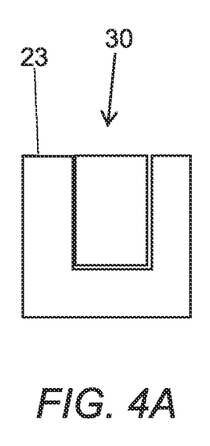
FIG. 4A shows a piezoelectric stall trigger in a non-activated state.
Figure 4B:
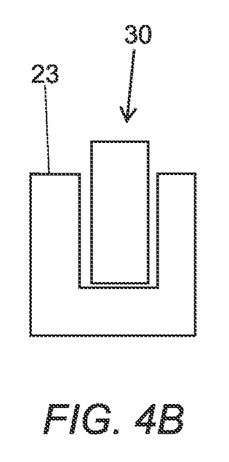
FIG. 4B shows the stall trigger of FIG. 4A in an activated state.

FIGS. 4A and 4B give a first example of the stall trigger 30. In this case, the stall trigger 30 is a piezoelectric device which, when activated, changes shape from a non-activated shape in FIG. 4A (in which it lies flush with the upper aerodynamic surface 23) to a lengthened activated state shown in FIG. 4B (in which it protrudes from the upper aerodynamic surface 23).

Figure 5A:
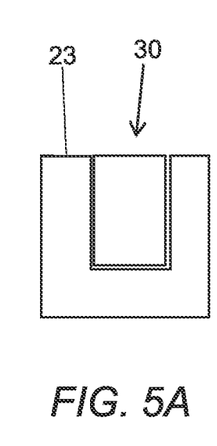
FIG. 5A shows a "smart material" stall trigger in a non-activated state.
Figure 5B:
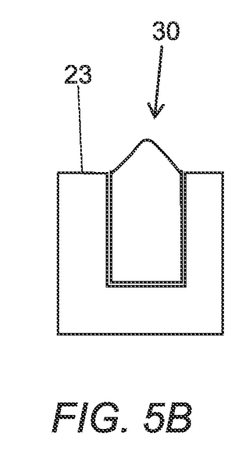
FIG. 5B shows the stall trigger of FIG. 5A in an activated state.

FIGS. 5A and 5B give a second example of the stall trigger 30. In this case, the stall trigger 30 is a piezoelectric polymer "smart material" device which, when activated, changes shape from a non-activated shape in FIG. 5A (in which it lies flush with the upper aerodynamic surface 23) to an activated state shown in FIG. 5B (in which it protrudes from the upper aerodynamic surface 23).

The planform profile of each stall trigger 30 is shown as square in FIG. 3, but this is non-limiting (for example the stall triggers may have a circular or rectangular planform profile).

In the examples of FIGS. 4, and 5, each stall trigger changes shape when activated. In other embodiments, each stall trigger 30 may be configured such that, on activation, it moves (by translating and/or rotating) so that it protrudes from the aerodynamic surface, thereby triggering the local separation of air flow. In this case each stall trigger may be driven by a solenoid, for example.

In other embodiments each stall trigger 30 may trigger the local separation of air flow in some other way.

The control system 40 is configured to monitor a parameter during flight of the aircraft, and activate each set 30a-d of stall triggers in response to the parameter reaching its respective activation threshold. Each set 30a-d of stall triggers has a different activation threshold, so as the parameter changes the stall triggers are activated in an activation sequence, thereby triggering local separation of air flow over the winglet 20 in a corresponding sequence of areas of the winglet 20.

Figure 7:
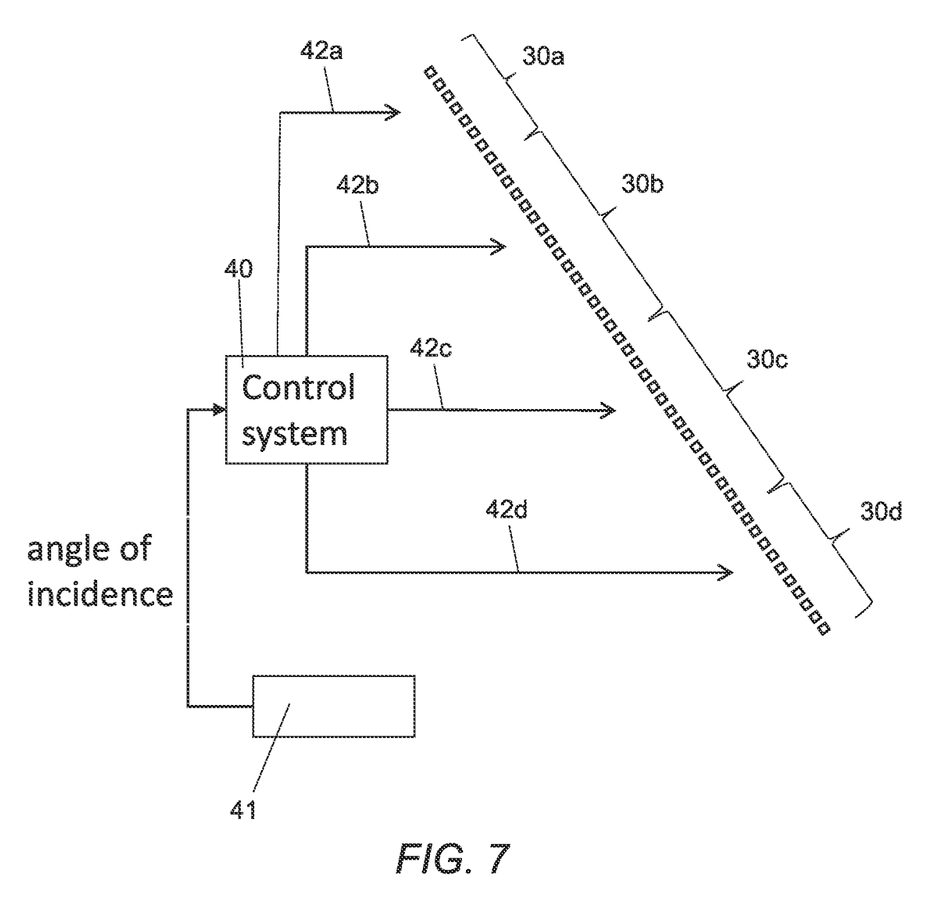
FIG. 7 shows a control system which controls the stall triggers on the basis of aircraft incidence.

FIG. 7 gives a first example of a suitable parameter which can be used to control the stall triggers. In this example the parameter is indicative of an angle of incidence of the aircraft. The angle of incidence is measured by an angle of incidence sensor 41, and fed into the control system 40 which activates the sets 30a-d of stall triggers via respective control lines 42a-d.

Figure 8:
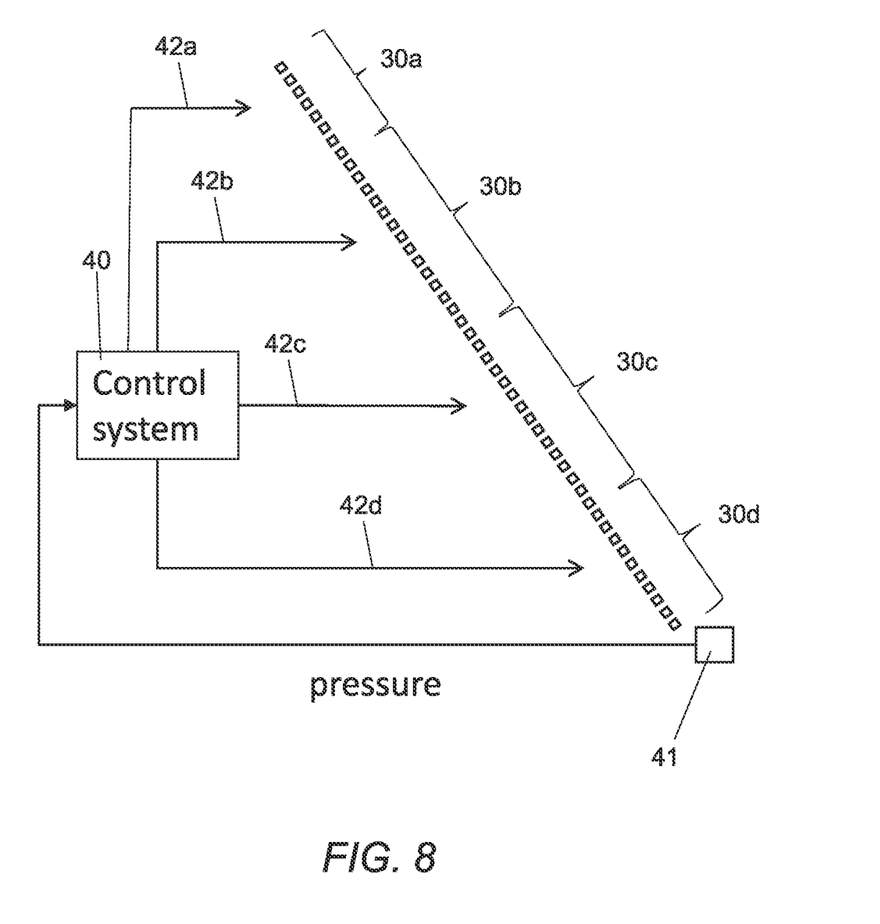
FIG. 8 shows a control system which controls the stall triggers on the basis of leading edge air pressure.

FIG. 8 gives a second example of a suitable parameter which can be used to control the stall triggers. In this example the parameter is indicative of a pressure at the leading edge 21 of the winglet 20. The pressure is measured by a local pressure sensor 42 positioned at the leading edge 21 of the winglet 20, and fed into the control system 40 which activates the sets 30a-d of stall triggers via the control lines 42a-d.

The examples of FIGS. 7 and 8 are non-limiting, i.e. other parameters may be measured during flight of the aircraft and used to control the stall triggers.

Figure 9:
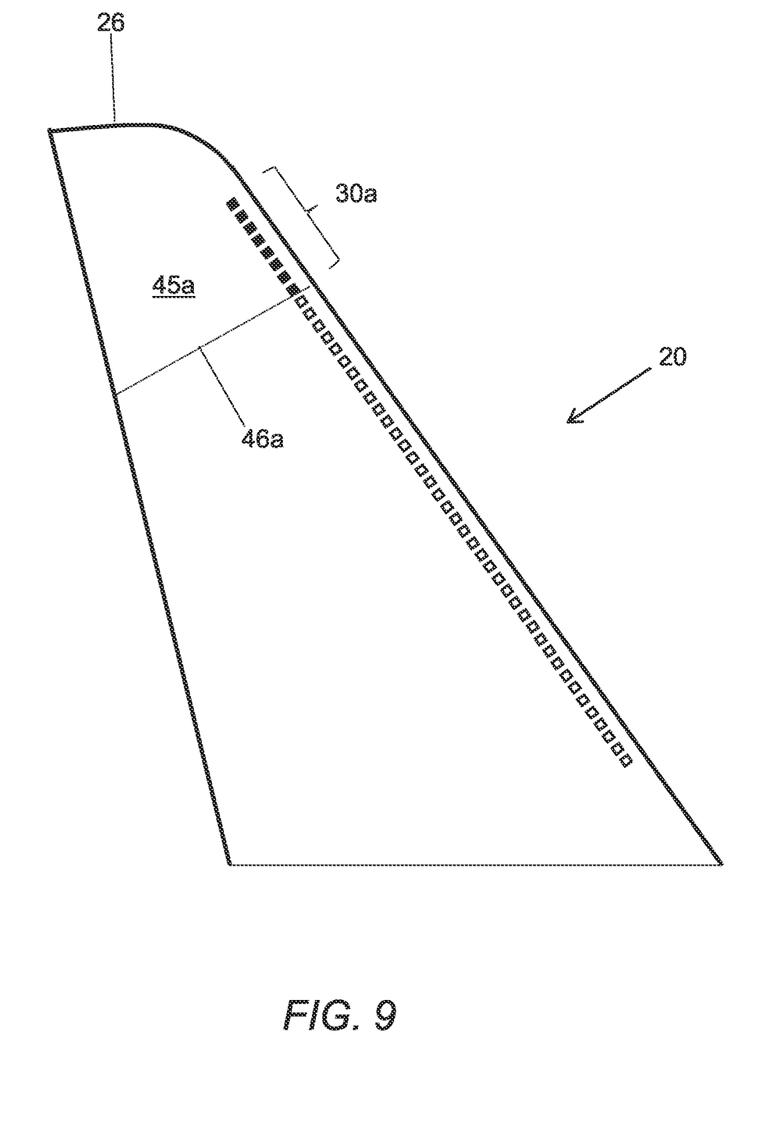
FIG. 9 shows a first step of an activation sequence.
Figure 10:
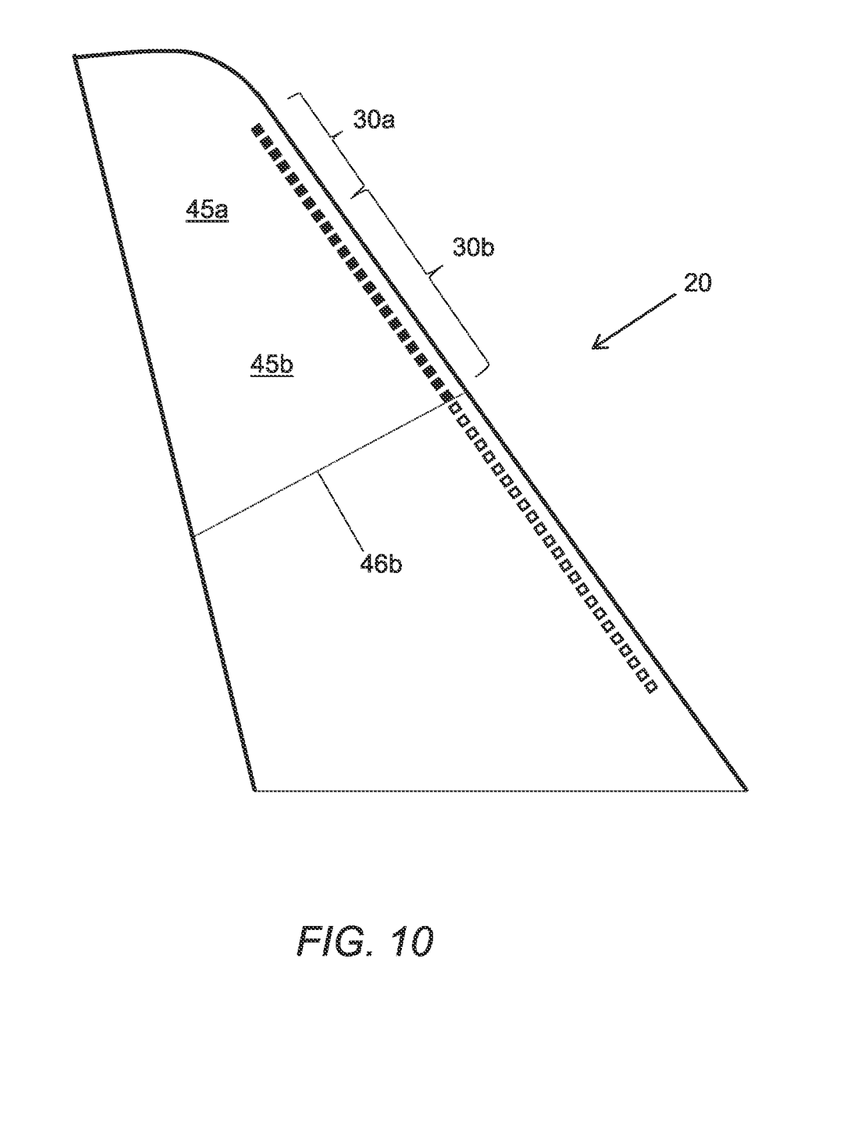
FIG. 10 shows a second step of an activation sequence.
Figure 11:
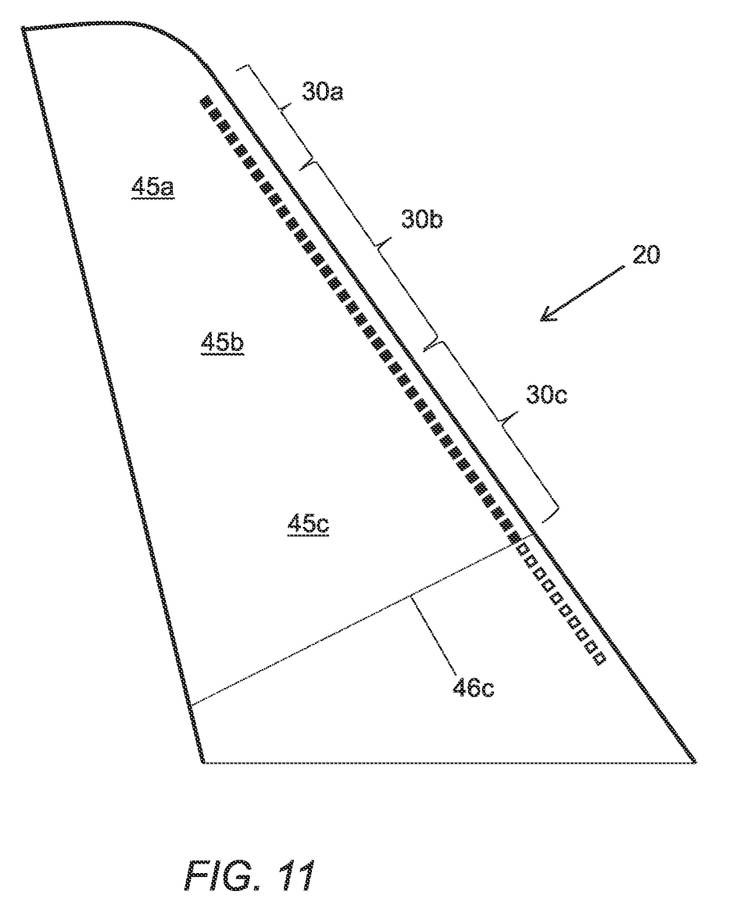
FIG. 11 shows a third step of an activation sequence.

FIG. 9-11 give an example of an activation sequence.

In a first step of the activation sequence shown in FIG. 9, the parameter reaches a first activation threshold which causes the control system 40 to activate a first set 30a of the stall triggers. This triggers local separation of air flow over the winglet 20 in an outboard area 45a of the winglet 20 near its tip 26. The area 45a of separated flow has an inboard boundary 46a.

In a second step of the activation sequence shown in FIG. 10, the parameter reaches a second activation threshold which causes the control system 40 to activate a second set 30b of the stall triggers. This triggers local separation of air flow over the winglet 20 in an outboard mid-span area 45b of the winglet 20. The first set 30a of stall triggers remain in their activated state, so the outboard area 45a of the winglet 20 remains stalled. The area 45a, 45b of separated flow has an inboard boundary 46b.

In a third step of the activation sequence shown in FIG. 11, the parameter reaches a third activation threshold which causes the control system 40 to activate a third set 30c of the stall triggers. This triggers local separation of air flow over the winglet 20 in an inboard mid-span area 45c of the winglet 20. The first and second sets 30a, 30b of stall triggers remain in their activated state, so the outboard and outboard mid-span areas 45a, 45b of the winglet 20 remains stalled. The area 45a, 45b, 45c of separated flow has an inboard boundary 46c.

Thus it can be seen in FIG. 9-11 that three sets 30a-c of stall triggers are activated in an activation sequence, thereby triggering local separation of air flow over the winglet in a corresponding sequence of three areas 45a-c of the winglet 20. In this example, the set 30d of stall triggers at the winglet root are not activated, but they may be activated at a higher angle of incidence.

If the parameter used to control the stall triggers is angle of incidence, as in FIG. 7, then each set of stall triggers may be activated in response to the angle of incidence increasing to reach a respective threshold. Thus as the angle of incidence increases, the length of the area of separated flow increases in an inboard direction as show in the progression from FIG. 9 to FIG. 11.

If the parameter used to control the stall triggers is pressure, as in FIG. 8, then each set of stall triggers may be activated in response to the pressure decreasing to reach a respective threshold. Thus as the pressure decreases, the length of the area of separated flow increases in an inboard direction as show in the progression from FIG. 9 to FIG. 11. In the example of FIG. 8 there is only a single pressure sensor, but in an alternative embodiment multiple pressure sensors may be used, each located near to a respective set of stall triggers. This enables each set of stall triggers to be controlled independently on the basis of its local pressure signal.

It should be noted that the number of stall triggers, and/or the number of sets of stall triggers, may be varied from the example shown in the drawings.

For example there may be only two, three or four sets of stall triggers, or a larger number of sets.

The total number of stall triggers may be as low as two or three, but more typically there are at least ten stall triggers, and preferably at least twenty.

Some or all of the sets 30a-d of stall triggers may consist of only a single stall trigger, but more typically each set comprises two or more stall triggers.

In the example of FIGS. 9-11, the activation sequence is a cumulative activation sequence which causes the area of separated flow to lengthen in a progressively inboard direction. In other words, the number of activated sets accumulates as the angle of incidence increases, and the stalled area of the winglet 20 grows accordingly. In other (non-cumulative) activation sequences, sets of stall triggers may be deactivated as the next set is activated.

The port and starboard winglet each carry a respective line of stall triggers. A single control system 40 may control both lines of stall triggers, or the port and starboard winglets may be controlled independently by respective different control systems.

The control system 40 may be housed in any part of the aircraft, including the fuselage, the wing or the winglet.

Figure 12:
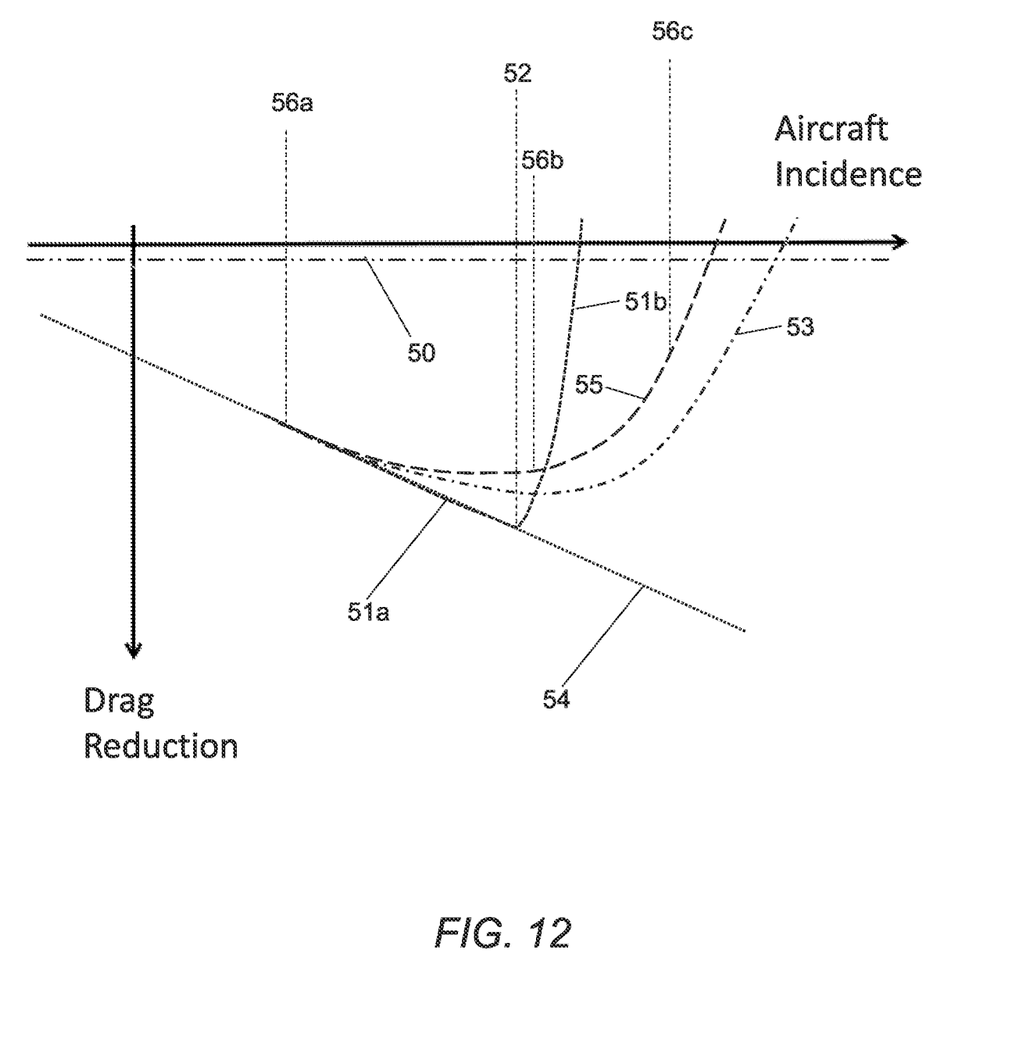
FIG. 12 is a graph plotting drag reduction versus aircraft incidence.

FIG. 12 is a graph illustrating the benefits of the stall trigger system. Plot 50 shows the drag of a wing without the winglet 20. A plot with two portions 51a and 51b indicates the drag reduction performance of a basic low-sweep winglet (i.e. the winglet 20 in the absence of the stall triggers).

The basic low-sweep winglet generates large drag benefits, as shown by plot portion 51a, up to higher incidences but can then suffer sudden flow separation and stall over a large area or all of the winglet at a "snap-stall" angle of incidence 52, so the drag reduction drops steeply. This results in a very large increase in drag and reduction in lift, as shown by plot portion 51b. Due to the sudden and sensitive nature of the effect, this can happen asymmetrically on the port and starboard winglets.

Plot 53 shows the drag performance of a winglet with a highly swept leading edge. A highly swept winglet generates a winglet tip vortex at moderate incidences. This reduces the local loading in this area and the total drag benefit relative to an ideal winglet (the plot of an ideal winglet being indicated at 54). As incidence is increased further, the winglet tip vortex moves toward the winglet root and correspondingly moves back outboard if aircraft incidence is reduced again. This behaviour produces more benign and symmetrical handling qualities, relative to the basic low-sweep winglet, as indicated by plot 53.

Plot 55 shows the drag performance of the winglet 20 with the stall trigger system described above. The first, second and third activation thresholds for the sets 30a-c of stall triggers are indicated at 56a, 56b and 56c respectively.

By triggering local flow separation at the winglet tip 26 at moderate incidences and then progressively increasing the extent of flow separation inboard as aircraft incidence is increased, the stall trigger system enables the behaviour of a highly swept winglet (as indicated by plot 53) to be emulated.

The actively triggered winglet 20 will have lower drag benefit at aircraft incidences below the "snap-stall" angle 52 at which the basic low-sweep winglet stalls, but higher drag benefit at aircraft incidences above the "snap-stall" angle 52.

The aircraft handling qualities behaviour may also be improved. Due to the fast activation of the stall triggers, the flow on the winglet can be dynamically controlled to suit aircraft manoeuvres.

In the embodiments described above, the stall triggers are distributed along the span of an upwardly directed winglet. However, the invention may be applied to other types of wing tip device, for instance a downwardly directed winglet; or a wing tip device which is not a winglet. It will also be appreciated that the invention is not limited to any particular shape or profile of wing tip device, for example the wing tip device may include continuously curved portions, straight portions, or any combination thereof.

The wingtip device may have a spanwise position of 70% span or higher; 80% span or higher; or 85% span or higher.

Typically the main wing structure has no stall triggers.

In the embodiments described above, the stall triggers are distributed along the span of an aircraft wing tip device which is attached to a main wing structure. However, the invention may be applied to an aircraft wing with no separate wing tip device. In this case the stall triggers may be distributed along the span of a tip of the aircraft wing, which may be a raked wing tip for example. In this case the plurality of sets of stall triggers may have a spanwise position of 70% span or higher (with no stall triggers in the innermost 70% of the span of the wing); 80% span or higher (with no stall triggers in the innermost 80% of the span of the wing); or 85% span or higher (with no stall triggers in the innermost 85% of the span of the wing).

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A stall trigger system comprising:
an aircraft wing tip or aircraft wing tip device;
a plurality of sets of stall triggers distributed along a span of the aircraft wing tip or aircraft wing tip device, wherein each set of stall triggers comprises one or more stall triggers which can be activated to trigger local separation of air flow over the aircraft wing tip or aircraft wing tip device; and
a control system configured to monitor a parameter, and activate each set of stall triggers in response to the parameter reaching its respective activation threshold, wherein each set of stall triggers has a different activation threshold.

2. The stall trigger system of claim 1, wherein the parameter is indicative of an angle of incidence or a pressure.

3. The stall trigger system of claim 1, wherein some or all of the stall triggers have a chordwise position which is less than 5% of a local chord length of the aircraft wing tip or aircraft wing tip device.

4. The stall trigger system of claim 1, wherein each stall trigger is configured such that, on activation, it changes shape or moves so that it protrudes from an aerodynamic surface of the aircraft wing tip or aircraft wing tip device, thereby triggering the local separation of air flow over the aircraft wing tip or aircraft wing tip device, and/or wherein each stall trigger is configured such that, on activation, it changes shape or moves so that it protrudes from the aerodynamic surface of the aircraft wing tip or aircraft wing tip device by less than 2% of a local chord length of the aircraft wing tip or aircraft wing tip device.

5. The stall trigger system of claim 1, comprising three or more sets of stall triggers.

6. The stall trigger system of claim 1, comprising at least ten stall triggers.

7. The stall trigger system of claim 1, wherein each set of stall triggers comprises two or more stall triggers.

8. The stall trigger system of claim 1, wherein the aircraft wing tip or aircraft wing tip device comprises a leading edge and a trailing edge, and at least part of the leading edge is substantially straight.

9. The stall trigger system of claim 1, wherein the stall triggers are distributed along the span of the aircraft wing tip or aircraft wing tip device in a line with an average sweep angle which is less than 50 degrees.

10. The stall trigger system of claim 1, wherein the aircraft wing tip or aircraft wing tip device is a winglet.

11. An aircraft wing comprising the stall trigger system of claim 1.

12. An aircraft wing according to claim 11, comprising a main wing structure, wherein the stall trigger system comprises an aircraft wing tip device attached to a tip of the main wing structure, and the stall triggers are distributed along a span of the aircraft wing tip device.

13. An aircraft wing according to claim 11, wherein the plurality of sets of stall triggers have a spanwise position of 70% span or higher; 80% span or higher; or 85% span or higher.

14. An aircraft comprising the stall trigger system of claim 1.

15. A method of activating a stall trigger system, the stall trigger system comprising a plurality of sets of stall triggers distributed along a span of an aircraft wing tip or aircraft wing tip device, wherein each set of stall triggers comprises one or more stall triggers, the method comprising: monitoring a parameter, and activating each set of stall triggers in response to the parameter reaching its respective activation threshold, thereby triggering local separation of air flow over the aircraft wing tip or aircraft wing tip device, wherein each set of stall triggers has a different activation threshold.

16. The method of claim 15, wherein the sets of stall triggers are activated in an activation sequence, thereby triggering local separation of air flow over the aircraft wing tip or aircraft wing tip device in a corresponding sequence of areas of the aircraft wing tip or aircraft wing tip device.

17. The method of claim 16, wherein the activation sequence is a cumulative activation sequence.

18. A method of activating a stall trigger system, the stall trigger system comprising a plurality of stall triggers distributed along a span of an aircraft wing tip or aircraft wing tip device, the method comprising activating the stall triggers in an activation sequence in a progressively inboard direction, thereby triggering local separation of air flow over the aircraft wing tip or aircraft wing tip device in a corresponding sequence of areas of the aircraft wing tip or aircraft wing tip device.

19. The method of claim 18, wherein the activation sequence is a cumulative activation sequence.

20. The method of claim 19, wherein the cumulative activation sequence causes an area of separated flow to lengthen in the progressively inboard direction.

* * * * *